Oct. 1, 1940.    B. H. THURMAN    2,216,679
DRIVE MEANS FOR CENTRIFUGAL SEPARATORS
Filed Nov. 22, 1937    2 Sheets-Sheet 1

Inventor
Benjamin H. Thurman
By Harris, Kiech, Foster & Harris
Attorneys

Patented Oct. 1, 1940

2,216,679

UNITED STATES PATENT OFFICE 2,216,679

DRIVE MEANS FOR CENTRIFUGAL SEPARATORS

Benjamin H. Thurman, Bronxville, N. Y., assignor to Refining, Inc., Reno, Nev., a corporation of Nevada Application November 22, 1937, Serial No. 175,987

3 Claims. (Cl. 308—145)

This invention relates to a drive means for a centrifugal separator and more particularly to a bearing structure for rotatively supporting a centrifugal bowl in a closed chamber into which a heating medium is introduced such that the heating medium is prevented from entering said bearing structure.

An object of the present invention is to provide a bearing structure for a centrifugal separator which is effective to prevent the heating medium employed around the bowl of said separator from entering the bearing structure.

Another object of the invention is to provide a bearing structure including floating anti-friction bearings in which the bearing structure is exposed to a heating medium and is provided with structure for preventing the heating medium from washing lubricant out of said bearings.

A further object of the invention is to provide a bearing structure exposed to a heating medium with means for sealing said bearing with oil during idle periods and for throwing condensed heating medium out of said bearing during operation thereof.

Other advantages and objects of the invention will appear in the following description of the preferred embodiments of the invention shown in the attached drawings, of which:

Figure 3 is a horizontal section taken on the line 3—3 of Fig. 2; and

Figure 4 is a horizontal section taken on the line 4—4 of Fig. 2.

Figure 2:
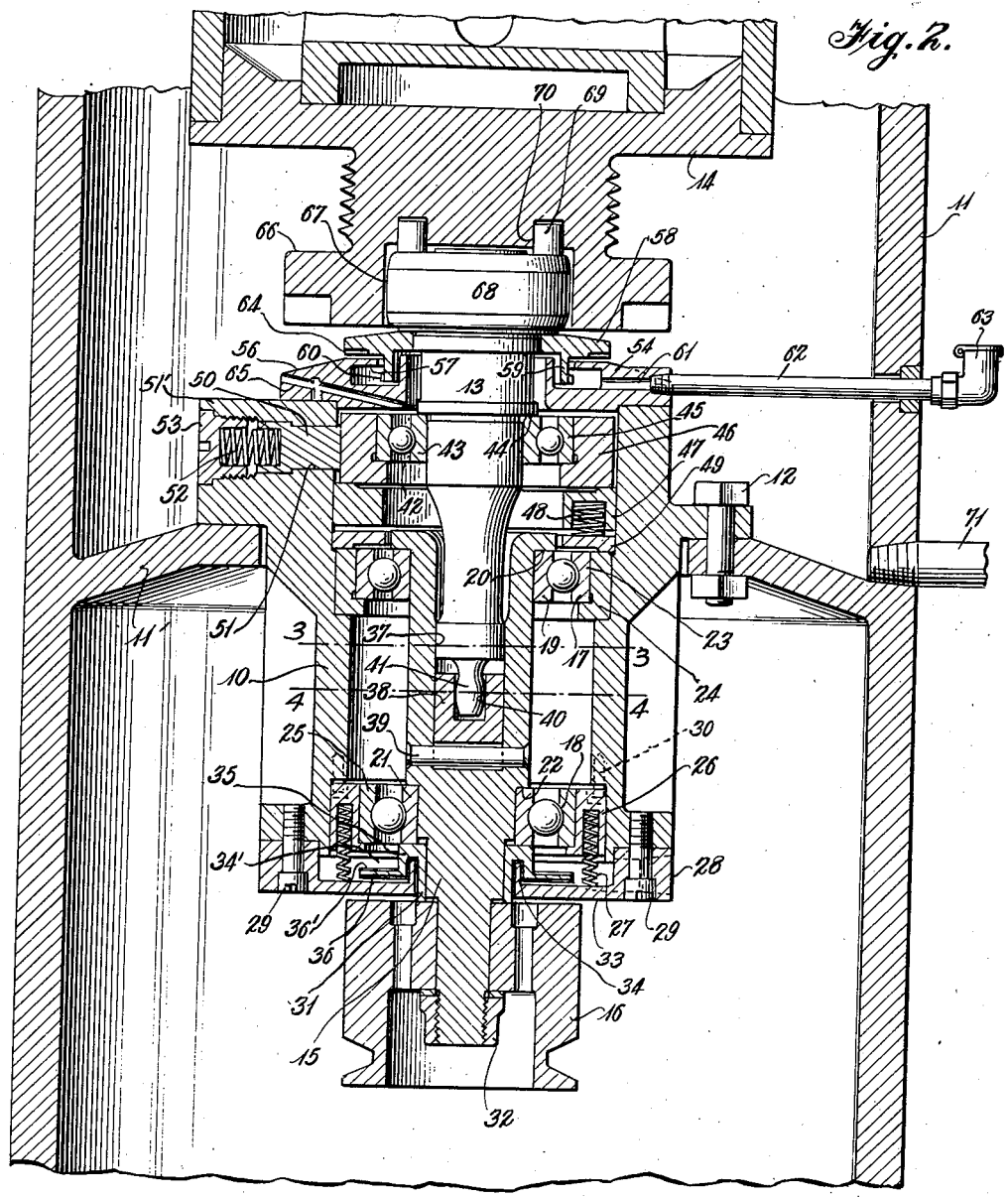
Figure 2 is a vertical section taken on the line 2—2 of Fig. 1.

Referring to the drawings, and more particularly to Figure 2 thereof, 10 indicates a bearing supporting structure secured to ledge 11' of a frame 11 of a centrifugal separator by bolts 12; 13 indicates a shaft upon which a centrifugal bowl 14 (the lower portion only of which is shown) is supported and 15 indicates a driving shaft keyed to the shaft 13 and provided with a pulley 16 through which the shaft 15 is driven from any suitable source of power.

The shaft 15 is supported by an upper ball bearing 17 and a lower ball bearing 18 held in the bearing supporting structure 10 as hereinafter described. The inner race 19 of the bearing 17 engages a shoulder 20 on the shaft 15 and the inner race 21 of the lower bearing 18 engages a shoulder 22 on the shaft 15. The outer race 23 of the upper bearing 17 is maintained in position by an annular member 24 positioned within the bearing structure 10. The outer race 25 of the lower bearing 18 is carried by an annular member 26 supported on a plurality of coil springs 27 engaging the bottom closure member 28 for the bearing supporting structure 10, the lower closure member 28 being secured to the bearing supporting structure 10 by means of a plurality of bolts 29. The annular member 26 is secured against rotation by a plurality of pins 30 positioned in recesses in the bearing supporting structure 10 and engaging recesses in the annular member 26. The springs 27 thus support the shaft 15 through the bearing 18 against downward vertical movement and the bearing 17 limits this downward movement and prevents overstressing the springs 27.

The inner bearing race 21 of the lower bearing 18 is clamped in position by an annular member 31 surrounding the shaft 15 and clamped against the race 21 by the pulley 16 and nut 32 holding the pulley 16 upon the shaft 15. The bottom closure member 28 for the bearing supporting structure 10 has its inward portion 33 spaced from the annular member 26 and bearing 18 to provide a lubricant chamber 34' and furthermore has its inner portion provided with an upstanding annular flange 34 to prevent lubricant from draining from said bearing. The annular member 31 is provided with a downwardly extending flange 35 enveloping the flange 34 of the bottom closure member 28, which downwardly extending flange terminates in a radially extending annular portion 36 positioned in the lubricant chamber and provided with radial grooves 36' so that rotation of the shaft 15 and annular member 31 causes lubricant to be thrown outwardly and upwardly into the bearing 18.

The shaft 15 is provided in its upper portion with a bore 37 to receive a member 38 pinned against rotation in said bore by a pin 39. The member 38 is provided with a slot 40 to receive a diametrically positioned key 41 carried by the lower end of the shaft 13 such that rotation of the shaft 15 causes rotation of the shaft 13. The shaft 13 has sufficient play in the bore 37 of the shaft 15 and the key 41 has sufficient movement in the slot 40 to provide for limited movement of the shaft 13 relative to the shaft 15 so that the shaft 13 and the centrifugal bowl 14 supported thereby may rotate about their center of gravity. The shaft 13 is supported by a ball bearing 42, the inner race 43 of which engages a shoulder 44 on the shaft 13. The outer race 45 of this bearing is supported on an annular member 46 loosely fitting the inner walls of the bearing supporting structure 10. The annular member 46 rests upon an annular member 47 supported by a plurality of springs 48, bearing upon an annular member 49 supported by the annular member 24. The springs 48 support the annular member 46 and bearing 42 and thus the shaft 13 for limited vertical or tipping movement. The annular member 46 supporting the bearing 42 is centered by a plurality of spring pressed plungers 50 positioned in bores 51 around the periphery of the upper portion of the bearing supporting structure 10. These plungers are pressed inwardly by springs 52 held in position by screw threaded members 53 threaded into the bores 41 through upwardly extending protuberances 51'. The shaft 13 is thus held in centered position by the springs 52 but is thereby enabled to rotate about the center of gravity of the shaft 13 and bowl 14.

Figure 1:
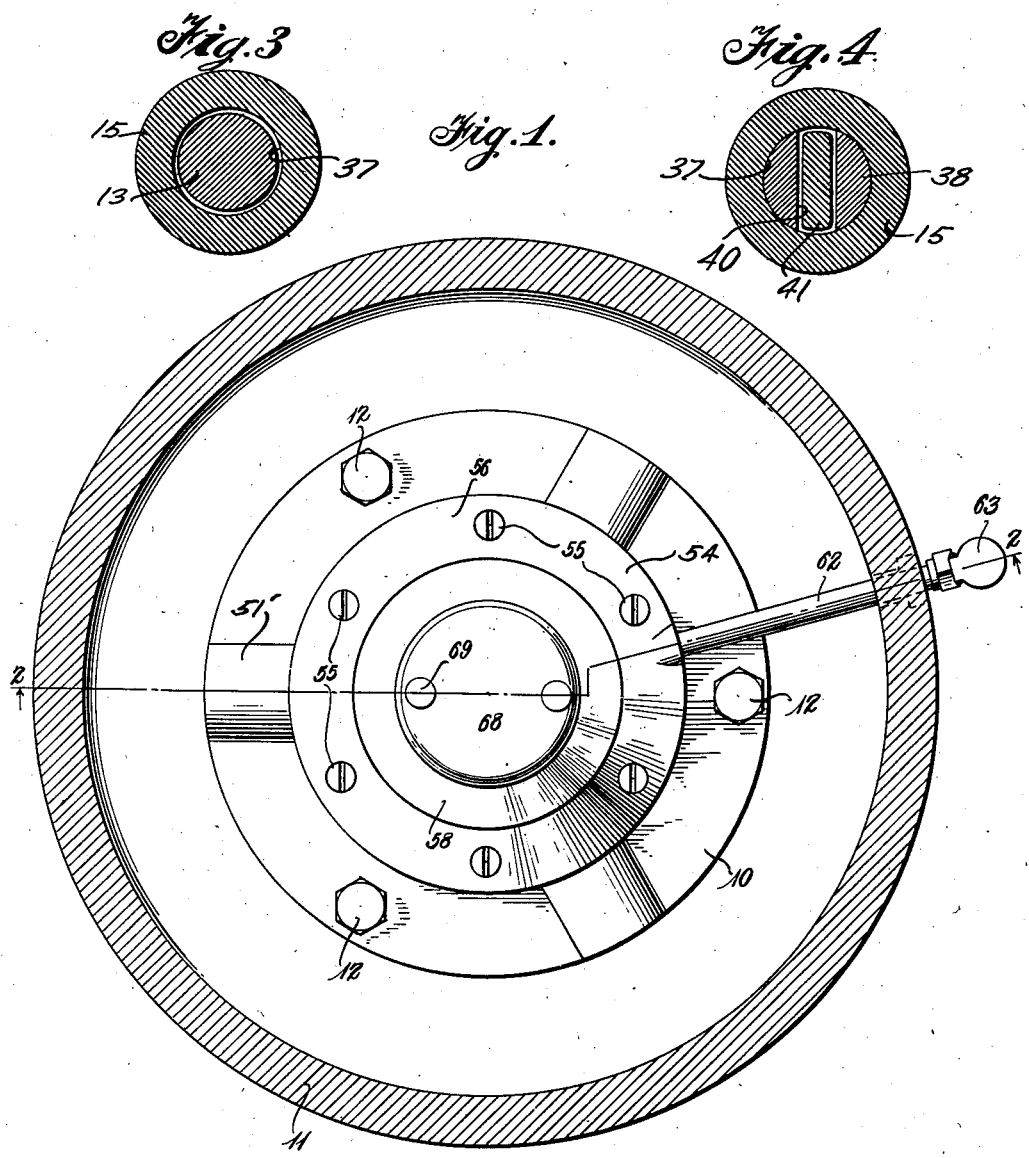
Figure 1 is a plan view of a bearing structure in accordance with the present invention.

The upper end of the bearing supporting structure 10 is closed by a cap member 54 secured to the bearing supporting structure 10 by a plurality of bolts 55 shown in Fig. 1. This cap member is provided with a conical upper surface 56 for draining condensed heating medium toward the periphery of the cap and is further provided with an annular recess 57 in the upper portion thereof having an outwardly extending annular portion. The shaft 13 is provided with an annular umbrella member 58 extending outwardly over the recess 57 and is further provided with a depending annular flange 59 projecting downwardly into the recess 57, the flange 59 being provided with outwardly extending projections 60 to provide a fan or impeller action for throwing materials entering the recess 57 toward the outer portion thereof. A duct 61 is drilled through the cap 54 into the recess 57 and is connected with a pipe 62 leading outwardly through the frame 11 of the separator. The pipe 62 terminates in an oil cup 63 which may be positioned as shown in Fig. 2 to receive oil such that the recess 57 may be filled with oil when the centrifugal separator is idle. During operation, the cap 63 is inverted to drain the oil from the recess 57 and also drain any materials entering this recess during operation of the centrifuge. The umbrella member 58 is also provided with slots 64 on the under portion adjacent the periphery thereof to provide a fan or impeller action for throwing materials away from the space between the umbrella member 58 and the cap 54 to prevent as far as possible foreign materials entering the recess 57. The cap member 54 is also provided with a duct 65 for admitting lubricant to the bearings 42, 17 and 18 which duct may be connected with any conventional oil delivery system (not shown).

The bowl 14 is provided with a downwardly extending portion 66 provided with a bore 67 fitting over the upper end 68 of the shaft 13, which upper end is provided with a plurality of projections 69 fitting into recesses 70 in the upper portion of the bore 67 of the bowl 14 so that the bowl is supported by the shaft 13 and keyed thereto for rotation.

As stated above, the frame 11 of the centrifuge extends upwardly and envelopes the bowl of the centrifuge machine to form a chamber into which a heating medium such as steam may be introduced to heat the bowl during rotation. An outlet 71 is provided adjacent the lower portion of the heating chamber so that heating medium may be circulated through the chamber and condensation removed if steam or other condensible heating medium is employed. This outlet is considerably below the top of the cap 54 for the bearing supporting structure such that condensed moisture is drained from the chamber without entering the bearing structure. However, steam condensing upon the bearing cap 54 forms moisture which would enter the bearing structure were it not for the umbrella member 58, impeller slots 64, annular recess 57 and depending flange 59 provided with the fan projection 60. The umbrella member 58 prevents condensed moisture running down the shaft 13 from entering the annular recess 57. Any steam entering this recess and condensed therein is thrown outwardly by the fan projection 60 and drained from the recess 57 through the duct 61 and pipe 62. Also, the grooves 64 on the umbrella member 58 act as fans to retard the entrance of steam into the annular recess 57. The projections 60 upon the depending flange 59 have been found to effectively prevent any steam which enters the annular recess 57 from passing upwardly over the inner portion of the cap 54 and then downwardly into the bearing 42. Thus any condensed moisture is prevented from reaching the bearings 42 and also any steam which would tend to wash lubricant from the bearings is prevented from reaching the same.

Since shaft 13 is mounted for limited movement both in a vertical direction and in a radial direction by reason of the springs 48 and 52 respectively and also because of the high rate of rotation (several thousand R. P. M.), ordinary packing structures have been found impractical to prevent steam or other heating medium from entering the bearing structure. It will be noted that all portions of the shaft 13 and umbrella member 58, including the depending flange 59, are spaced from adjacent portions of the upper bearing cap 54 a sufficient distance to provide for the above described movement of shaft 13 relative to the cap 54, without bringing adjacent stationary and rotating portions of the bearing sealing means into contact. Even though such adjacent portions are spaced from each other the bearing sealing structure described has been found to be an effective means for preventing the entrance of foreign material into the bearings.

While I have described the preferred embodiment of my invention, it is understood that I am not to be limited to the details thereof but the invention may be varied within the scope of the following claims:

Having described my invention, I claim:

1. In a centrifugal separator provided with a rotating bowl and a chamber substantially completely surrounding said bowl to receive a heating medium, a bearing for said bowl, a bearing supporting structure closing the lower portion of said chamber, means for preventing entrance of said heating medium into said bearing comprising a closure member for said bearing supporting structure, said closure member having an annular groove therein, a member carried by said rotating bowl and having a peripheral portion extending outwardly over said annular groove and an annular flange extending into said annular groove, and means providing for filling said annular groove with oil when said centrifugal is idle and for draining said groove when said centrifugal bowl is rotated.

2. In a centrifugal separator provided with a rotating bowl and a chamber substantially completely surrounding said bowl to receive a heating medium, a bearing for said bowl, a bearing supporting structure for said bearing closing the lower portion of said chamber, means for preventing entrance of said heating medium into said bearing comprising a closure member for said bearing supporting structure, said closure member having an annular groove therein, a member carried by said rotating bowl and having a peripheral portion extending outwardly over said annular groove and an annular flange extending into said annular groove, means providing for filling said annular groove with oil when said centrifugal is idle and for draining said groove when said centrifugal bowl is rotated, said annular groove having a radially extending annular portion, and impeller means carried by said annular flange for throwing foreign material entering said groove into said annular portion of said groove.

3. In a centrifugal separator having a rotating bowl and a structure enclosing said bowl to receive a heating medium, a bearing for said bowl having a bearing supporting structure closing the lower portion of said chamber, said bearing supporting structure extending upwardly into said chamber to prevent condensed heating medium from entering said bearing, and means for preventing uncondensed heating medium from entering said bearing, said means comprising a member carried by said bowl and extending outwardly over said bearing and provided with impeller portions for directing heating medium away from said bearing, said bearing supporting structure having an annular groove in the upper surface thereof and said annular member having a depending flange extending into said annular groove and provided with impeller portions for directing heating medium out of said annular groove.

BENJAMIN H. THURMAN.